VAN ZANDT M. MOORE.
FRICTION CLUTCH.
APPLICATION FILED OCT. 3, 1908.

951,651.

Patented Mar. 8, 1910.
3 SHEETS—SHEET 2.

WITNESSES:
Brennan B. West.
Arthur S. Remberg.

INVENTOR,
Van Zandt M. Moore.
By Bakes Fouls Hull
ATTYS.

VAN ZANDT M. MOORE.
FRICTION CLUTCH.
APPLICATION FILED OCT. 3, 1908.
951,651.
Patented Mar. 8, 1910.
3 SHEETS—SHEET 3.
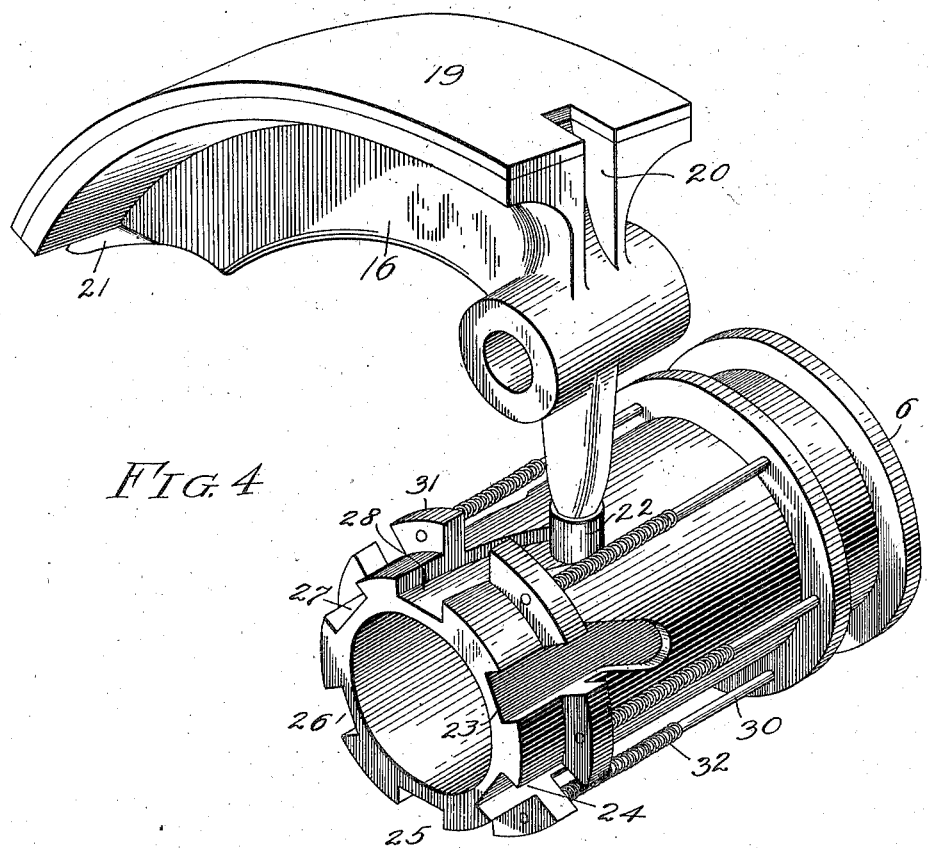
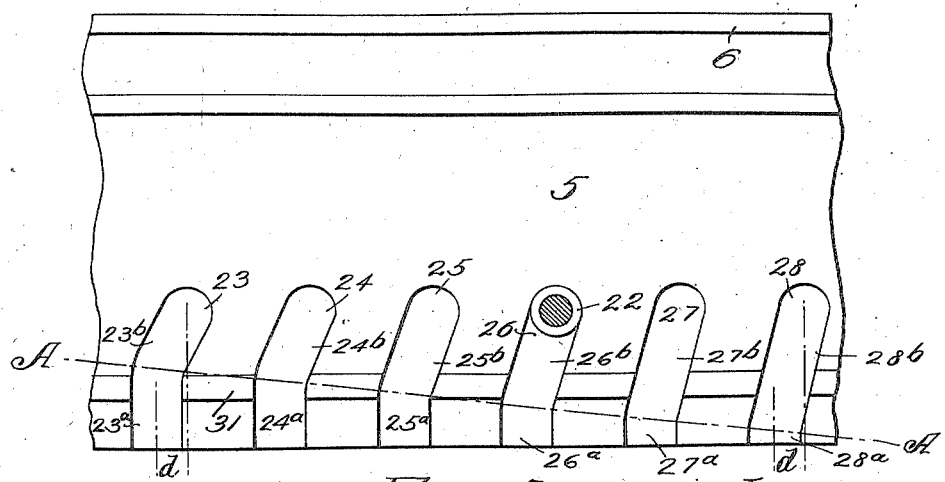
WITNESSES:
Brennan B. West.
Arthur S. Remberg.
INVENTOR,
Van Zandt M. Moore.
BY Bakewell Kerr & Hull,
ATTYS.

UNITED STATES PATENT OFFICE.

VAN ZANDT M. MOORE, OF CLEVELAND, OHIO.

FRICTION-CLUTCH.

951,651. Specification of Letters Patent. Patented Mar. 8, 1910.

Application filed October 3, 1908. Serial No. 456,078.

*To all whom it may concern:*

Be it known that I, VAN ZANDT M. MOORE, a citizen of the United States, residing at Cleveland, in the county of Cuyahoga and State of Ohio, have invented a certain new and useful Improvement in Friction-Clutches, of which the following is a full, clear, and exact description, reference being had to the accompanying drawings.

My invention provides a construction for the transmission of power from a drive shaft to a driven shaft in which the driven shaft will progressively take up the motion of the drive shaft by virtue of which the machine or other device operated by the driven shaft, as well as the driving motor, will be relieved from those jars and jerkings which result whenever the entire power of the drive shaft is suddenly communicated to the driven shaft.

The progressive action of my clutch is entirely automatic, it being necessary simply to throw the clutch in, when, due to the construction hereinafter set out, the driven shaft will gradually take up the motion of the drive shaft and will ultimately be driven at the same rate of speed.

The invention further comprises the elements and combinations thereof set out in the claims.

The clutch may be normally in position to hold the drive shaft and driven shaft in clutched relation and is so illustrated herein.

Reference should be had to the accompanying drawings, forming a part of this specification, in which—

Figure 1:
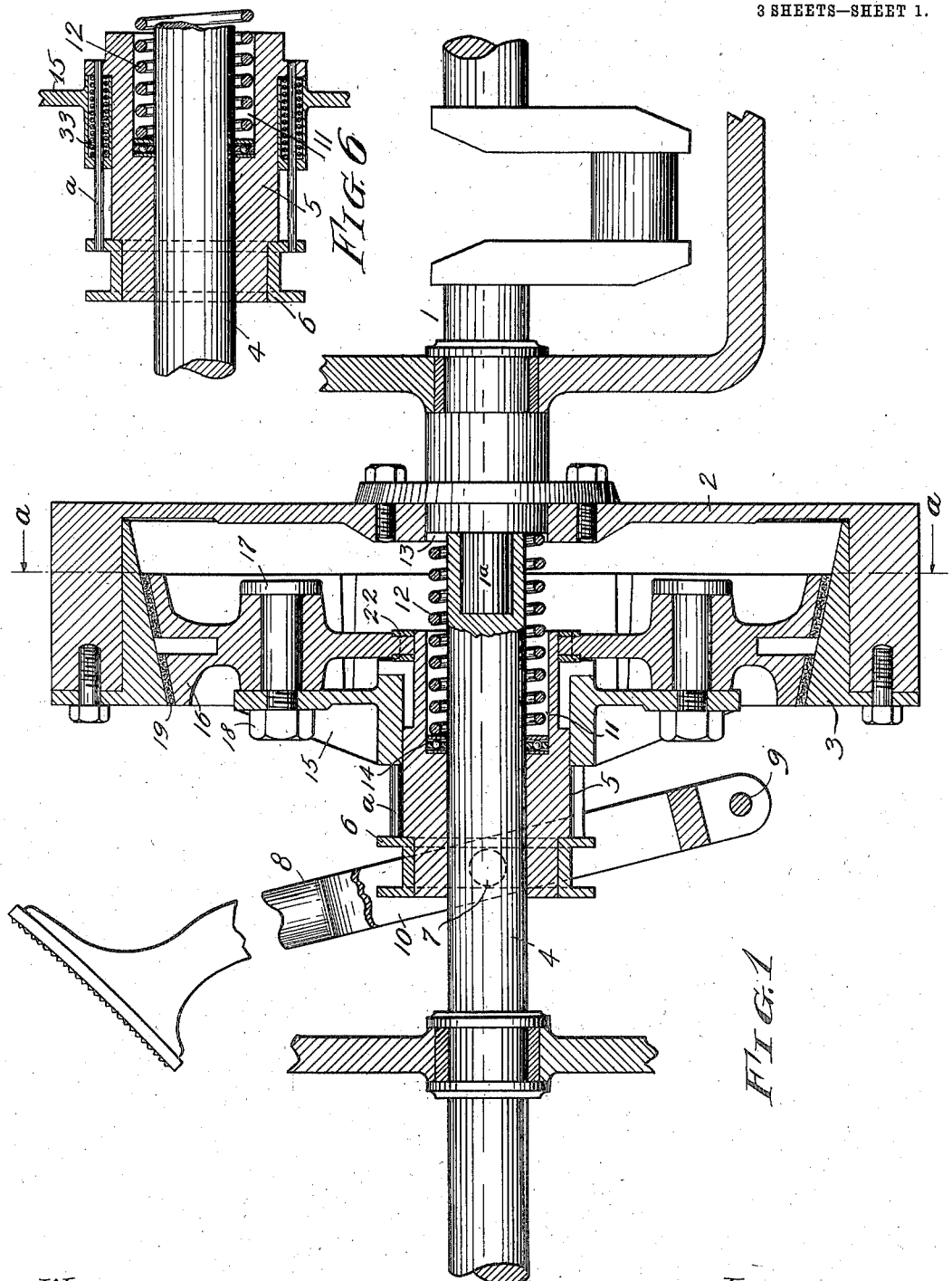
Figure 2:
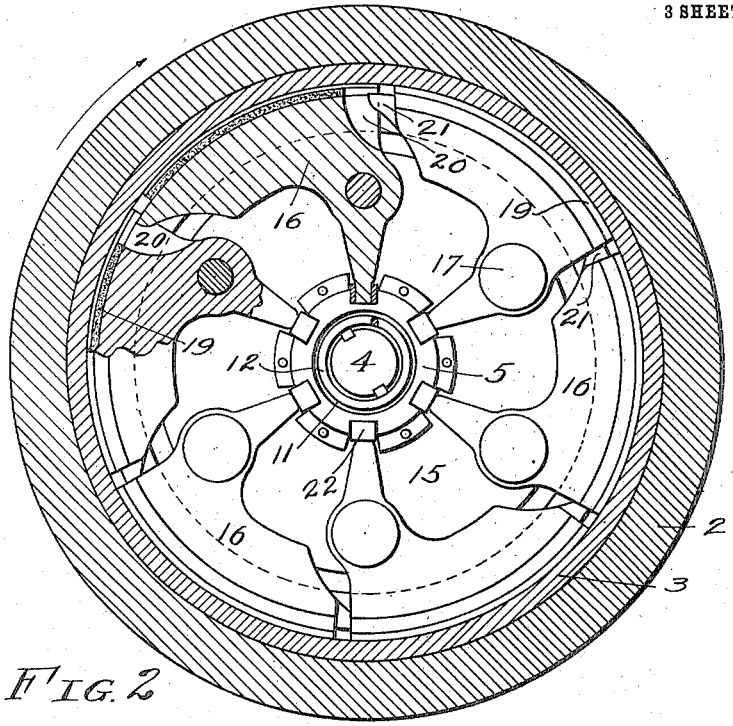
Figure 3:
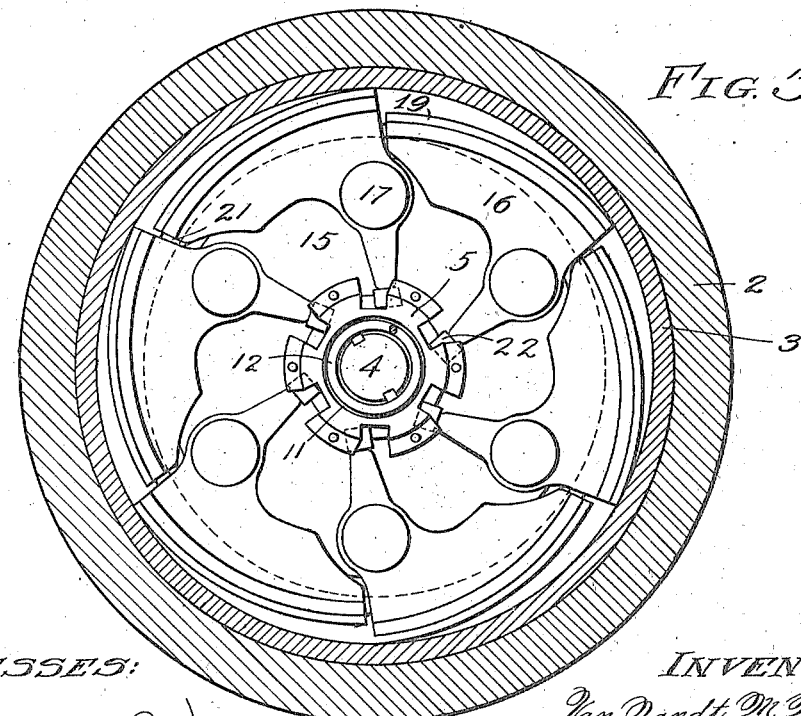

Figure 1 is a longitudinal sectional elevation of the clutch; Fig. 2 is a section upon the line $a-a$ of Fig. 1 with the clutch used in clutched position, some of the clutch shoes being shown in partial section; Fig. 3 is a view similar to Fig. 2, with the shoes in unclutched position; Fig. 4 is an enlarged perspective showing a clutch shoe and the sleeve for operating the same in their operative relation; Fig. 5 is a development in a horizontal plane of the sleeve for operating the shoes; Fig. 6 is a sectional elevation of the operating sleeve and associated parts.

As shown in Fig. 1, the drive shaft is represented at 1, which in this instance is shown as the crank shaft of an engine, though it will be perfectly obvious that motion may be imparted to the shaft 1 by any desired form of motor. Again, I have illustrated my invention as being associated with and comprising the fly wheel upon the crank shaft, but it will be evident that my device need not necessarily be so embodied.

Upon the shaft 1 is mounted a chambered member 2, in this instance, a fly wheel recessed upon one side. This recessed portion is occupied by the operating parts of the clutch. A member 3 is secured upon the shell 2, which member is composed of suitable friction material, and is secured to the member 2 by means of bolts or in any desired manner. The member 3 is formed with an inclined face upon its inner surface which engages with the friction shoes in a manner hereinafter described.

The member 2 may be made integral with the drive shaft, if desired, or it may be attached thereto in any desired manner, as shown in Fig. 1.

The driven shaft is indicated by 4. It is mounted on a suitable bearing beyond the clutch and at its inner end has a bearing on a reduced portion $1^a$ of the shaft 1, or the member connecting that shaft with the chambered member 2. On this driven shaft is mounted a sleeve 5 which is splined or otherwise secured on the shaft so as to rotate therewith, but is capable of longitudinal movement along the same. Near the outer end, the sleeve is provided with a collar 6 formed with a groove in which engage pins 7 formed upon a lever 8, a portion of the lever yoking around the collar by two arms 10 upon which are located the pins 7 in proper position to engage the collar 6 upon opposite sides thereof.

The sleeve 5 has an enlarged bore, as indicated at 11, for the accommodation of a spring 12, which spring presses upon the member 2 and occupies a suitable recess 13 whereby the spring is held in its proper position. The inner end of the recess 11 is occupied by a ball thrust bearing 14 against which the opposite end of the spring 12 abuts. This allows the spring to rotate freely when the sleeve is stationary.

Upon the sleeve 5 is mounted a plate 15 which, by suitable key and key-way connection, is secured to the sleeve so as to rotate therewith, but be capable of longitudinal movement along the same.

Upon the plate 15 are mounted a plurality of friction members 16, which are formed at their central portions with a boss through which is an opening occupied by a stud 17 which screws into the plate 15, and is clamped by means of a nut 18. The studs 17 are of sufficient length to allow the members 16 to swing about the stud 17 as a pivot. At the outer ends, the members 16 are formed with surfaces which are portions of a cone, so as to be complementary to the surface of the member 3. Upon these complementary surfaces are secured suitable friction material 19, whereby clutch shoes are provided.

As shown in Figs. 2 and 3, the engaging portion of each shoe is beyond the point at which it is pivoted. It will be seen that when the shoes are in unclutched positions, one end thereof will always be in contact with the friction member 3, so that at no time will there be any rattling, whether the clutch is engaged or idle. The shoes are formed at one end with a recess 20 and at the opposite end with a projection 21, and when assembled, the projecting end 21 of each shoe occupies the recess 20 of the shoe which is immediately adjacent to it. In this manner the shoes are retained in alinement.

The inner ends of the members 16 carry rollers 22 which are adapted to engage respectively with a series of grooves, as 23, 24, 25, 26, 27 and 28 formed in the inner end of the sleeve 5. There is one groove for each clutch shoe and these grooves all have inclines with respect to the axis of the sleeve, so that the movement of the sleeve swings the shoes into clutching or unclutching position.

In Fig. 5 is shown a development in a horizontal plane of the grooves 23 to 28 respectively. It will be noted that each of the grooves is formed with a straight portion 26ª, 27ª, etc., and with an inclined portion 26ᵇ, 27ᵇ, etc., and that the length of the straight portions of the grooves decrease from the groove 23 to the groove 28, while the length of the inclined portions of the said grooves increase in the reverse direction, the dividing points between the straight and the inclined parts of the grooves being indicated by the line A—A.

While the points at which the inclined portions of the grooves begin to diverge from the straight portions vary in successive grooves, the variance is in the angle of divergence, and not in the extent of it, which is the same in all the grooves. This is indicated by the lines $d$ and $d$ representing the total lateral distance between centers in the most widely differing grooves, i. e. 23 and 28 in Fig. 5. Accordingly, while the time at which the clutch shoes begin to act, as the sleeve moves, varies, the total movement of each shoe is the same.

The normal position of the shoes 16 is in clutched position, due to the expansive force of the spring 12, and in this position, the rollers 22 on the shoe shanks will engage their respective grooves at their outer ends or in the straight portions thereof. When the lever 8 is pressed inwardly against the action of the spring 12, the sleeve 5 is carried in a forward direction, and the rollers travel in a path represented by the configuration of the groove, and the shoes are accordingly moved about their pivots in a direction to release them from their engagement with the friction member 3. When in unclutched position, the rollers 22 will occupy positions at the inner ends of the grooves with which they are associated.

When it is desired to bring the drive and driven shafts into clutched relation, the lever 8 will be released, whereupon the action of the spring 12 will cause the sleeve 5 to be pushed back. This will cause the rollers 22 to travel in the grooves toward the outer end thereof. By reference to Fig. 5, it will be seen that the roller which occupies the groove 23 will traverse the inclined portion 23ᵇ thereof and move into the straight portion 23ª before the roller which occupies the groove 24 moves into the portion 24ª, or in fact before any of the rollers that occupy the other grooves move into the straight portions of their respective grooves. This will cause the shoe which is operated by the roller associated with the groove 23 to come into contact with the friction surface 3, at a period of time in advance of that of any of the other shoes. But it will be immediately followed by the shoe which is operated by the roller in the groove 24 which in turn will be immediately followed by the shoe operated by the groove 25 and so on, until all the shoes are in engagement. It will be seen that in this way the shoes are caused to engage the friction surface and to become clutched in a progressive manner so that all power which is developed by the drive shaft 1 will be transmitted to the driven shaft 4 progressively, or in a series of steps, which will relieve the drive shaft and driven shaft and their associated devices from any jar or racking which is so destructive to the parts which are in connection with said shafts.

When the shoe which is associated with the groove 28 has been brought into clutched position, the entire power developed by the shaft 1 will be transmitted to the shaft 4 for the spring 12 will serve to hold the shoes in complete engagement with the friction surface 3.

Upon the sleeve 5 are mounted a series of rods 30 which are secured at one end to the collar 6 and at their other ends to a broken flange 31. Upon the rods 30 are springs 32 which in their assembled positions will be seated within recesses 33 formed in the central hub portion of the plate 15. The purpose of these springs is to hold the members 15 and 5 in their proper relation to each other and to prevent rattling, looseness and uncertainty of the plate and shoes when the sleeve is moved to operate the clutch.

In Fig. 2 the direction of rotation of the outer clutch member is indicated by the arrow. The action of this rotation on the engaged clutch shoes is to move them in the same direction, which tends to swing them about their pivots into closer engagement with the inclined surface on the outer clutch member. Accordingly, my clutch automatically tightens itself, constantly compensating for wear. In this self-tightening feature my invention also differs radically from the ordinary conical clutch wherein the rotation has no such effect.

Having thus described my invention, I claim:

1. The combination of a driving and a driven member having conical surfaces, one of which is composed of a number of individually pivoted sections arranged in a circuit and means for causing axial movement of said sections as a unit relatively to the other member, and means for swinging the sections individually on their pivots.

2. The combination of a driving and a driven shaft, a conical friction member upon one of said shafts, a second member having a plurality of friction shoes arranged in a circuit and adapted to engage the friction member mentioned, and means for causing such engagement to be progressive by the individual movements of the shoes, and means for maintaining the engagement by axial pressure of the two members relative to each other.

3. The combination of a conical friction member, a plurality of friction shoes, each composed of a segment of a cone and all being arranged to present one interrupted conical surface, and means for causing said shoes to move *en masse* longitudinally and means for moving said shoes individually to engage the friction member successively.

4. The combination of a conical friction member, a series of shoes arranged in a circuit and having their combined surfaces forming an approximate complementary member, means for changing the distance in an axial direction between said member and said shoes, and means for causing the shoes to successively engage or disengage the member first mentioned.

5. The combination of two conical clutch members, one of which has its clutching surface smooth and the other its clutching surface composed of a number of rocking shoes, and means for rocking such shoes individually to cause the engagement or disengagement, and means for pressing the same axially to maintain them in presentation.

6. The combination of two conical clutch members, one of which has its clutching surface composed of a number of pivoted shoes, operating mechanism acting on said shoes progressively, and a spring for pressing said shoes axially.

7. The combination of a driving and a driven shaft, a conical friction member mounted upon one of said shafts, a plurality of conical segmental members adapted to engage the friction member mounted upon the other of said shafts, a spring normally tending to hold the said members in engagement, means for holding the friction members disengaged, and means whereby the plurality of members may progressively engage the other friction member.

8. The combination of a driving and a driven shaft, a conical friction member mounted upon one of said shafts, a sleeve mounted upon the other of said shafts, and capable of sliding thereon but rotating therewith, a series of conical segment friction shoes, a longitudinally movable member on which the same are mounted, means tending to move such member axially and operative connections between the shoes and the said sleeve, whereby the said series of shoes may be operated by the sliding movement of the sleeve.

9. The combination of two clutch members, one of which has its clutching surface composed of a number of pivoted shoes, an axially movable operating sleeve having inclined guides with which inwardly extending arms of said shoes engage, and an axially movable member on which the shoes are pivoted.

10. The combination of two clutch members, one of which has its clutching surface composed of a number of pivoted shoes having inwardly extending arms with rollers thereon, and an operating sleeve having inclined grooves which said rollers occupy, the incline of said grooves beginning at successively different points whereby the application is progressive.

11. The combination of two clutch members, one of which has its clutching surface composed of a number of pivoted shoes having inwardly extending arms with rollers thereon, and an operating sleeve having grooves which said rollers occupy, said grooves being partially parallel with the axis of the sleeve and partially at an angle thereto, the point of divergence of such angular portion varying in the different grooves.

12. The combination of a driving and a driven shaft, a conical friction member mounted upon one of said shafts, a plurality of conical friction members mounted so as to rotate with the other of said shafts, said last mentioned members being pivotally mounted and having their outer ends adapted to engage with the other friction member, an axially movable member on which such mounting is effected, a sleeve mounted so as to rotate with one of the shafts but slidable thereon, the inner ends of said friction members engaging with the said sleeve, laterally deflecting grooves in the said sleeve for guiding the ends of the said friction members whereby, as the sleeve is moved longitudinally, the said friction members will be moved about their pivots to engage or disengage the other friction member.

13. The combination of a driving and a driven shaft, a friction member mounted upon the driving shaft, a supporting member mounted upon the driven shaft, a plurality of friction members pivotally secured upon said support, the outer ends of said friction members engaging the friction member upon the driving shaft, a sleeve slidably mounted upon the driven shaft, there being a plurality of grooves in said sleeve with which the inner ends of said friction members engage, said grooves being formed partially parallel with the axis of the sleeve and partially at an angle thereto, the point of divergence of such angular portion varying in the different grooves so as to cause the friction members to successively and progressively engage the friction member upon the driving shaft, when the sleeve is moved in one direction.

14. The combination of a driving and a driven shaft, a friction member mounted upon the driving shaft, a plurality of friction members mounted upon the driven shaft, said members being pivotally supported intermediate of their ends, said members engaging the friction member upon the driving shaft at their outer portions, a sleeve slidably mounted upon the driven shaft and adapted to engage the friction members at their inner portions, a spring acting between the friction member on the driving shaft and driven shaft normally tending to hold them in engagement, means for moving said sleeve so as to cause the disengagement of the friction members upon the driven shaft from the friction member upon the driving shaft, and means for causing the said friction members upon the driven shaft to progressively engage the friction member upon the driving shaft when the sleeve is moved in the opposite direction.

15. The combination of a driving and a driven shaft, a conical friction member mounted upon said driving shaft, a plurality of conical segmental friction members, a movable spring pressed member on which said plurality of friction members are pivotally mounted, a sleeve surrounding the driven shaft and engaging with one end of the friction members mounted upon the driven shaft, and means for moving said sleeve whereby the said friction members upon the driven shaft will be turned about their pivotal points to cause the said friction members to engage or disengage the friction member upon the driving shaft.

16. The combination of a shaft, an axially movable plate carried thereby, a series of bell cranks pivoted to the plate, a sliding sleeve formed to rock the bell cranks, the free arms of the bell cranks constituting conical segmental friction shoes, and a conical clutch member with which such shoes coöperate.

17. The combination of two clutch members, one of which has its clutching surface composed of a number of pivoted shoes having inwardly extending arms, an operating sleeve having inclined grooves which said arms occupy, the incline of said grooves beginning at successively different points, whereby the application is progressive, a spring acting on said sleeve and tending to move it axially in one direction, and means for moving the sleeve axially in the other direction.

18. The combination of a pair of conical clutch members, one being composed of a series of individually pivoted shoes arranged in a circuit, said pivoted shoes having inwardly extending arms, a sleeve having inclined guideways with which the arms engage, and a member slidably mounted on said sleeve and carrying the pivots of said shoes.

19. The combination of a slidable operating sleeve, a plate slidable on said sleeve, clutch shoes pivoted on said plate and having shanks adapted to engage said sleeve to be operated thereby, a spring between the plate and sleeve, a second clutch member, and a main spring between the same and said sleeve.

20. The combination of a driving and a driven shaft, a friction member mounted upon the driving shaft, a sleeve mounted upon the driven shaft adapted to rotate therewith but capable of sliding along the same, a supporting member mounted upon the said sleeve, a plurality of friction members mounted upon said supporting member and adapted to engage the friction member upon the driving shaft, a plurality of rods mounted upon the sleeve, springs surrounding said rods and adapted to exert pressure between the sleeve and supporting member, and means for operating the sleeve so as to engage and disengage the friction member.

21. The combination of a driving and a driven shaft, a friction member mounted upon the driving shaft, a sleeve mounted upon the driven shaft adapted to slide along the same and to rotate therewith, a supporting member mounted upon the sleeve, a plurality of friction members mounted upon the supporting member and adapted to engage the friction member upon the driving shaft, a plurality of springs interposed between the sleeve and supporting member, there being recesses in the said supporting member in which the springs are housed, and means for operating the sleeve to engage and disengage the friction members.

22. The combination of a driving and a driven shaft, a friction member upon said driving shaft, a sleeve upon said driven shaft adapted to rotate with the said shaft but capable of sliding along the same, said sleeve being recessed at one end, a spring surrounding the driving and driven shaft and seated at one end within the recess in the sleeve and at its opposite end bearing against the friction member upon the driving shaft, a plurality of friction members adapted to engage the friction member upon the driving shaft, and operating connections between the sleeve and friction members whereby when the sleeve is moved the friction members will be caused to engage or disengage.

23. The combination of a clutch member having a conical surface, a coöperating clutch member slidable axially and composed of a series of shoes movable toward and from the axis, and means for causing such movement progressively.

24. The combination of a clutch member composed of a series of segments pivoted on axes parallel with the axis of rotation of the clutch, the combined surfaces of which form an interrupted cone, a coöperating clutch member having a recess which the member first mentioned occupies and having an inner conical friction surface, and means for causing axial pressure between the two clutch members.

25. A clutch member constituting a flywheel and formed with a recess in its side and having a female conical surface as the periphery of such recess, combined with a coöperating conical clutch member occupying such recess and formed of a series of shoes mounted on a longitudinally movable member and individually movable in a transverse plane.

26. A conical friction clutch wherein one member is composed of individually movable shoes having friction faces which are segments of a cone, and a spring for pressing said sections bodily in a longitudinal direction toward the other friction member, and means for moving the segments individually in a transverse direction toward said other member.

27. A conical friction clutch wherein one member is composed of individually movable shoes having friction faces which are segments of a cone, means for moving the segments individually and successively in a transverse direction to engage with the other member, and means for exerting pressure in an axial direction on the member composed of the individual shoes.

28. A conical friction clutch wherein one member is composed of individually pivoted shoes, the normal direction of rotation of the other member tending to cause said shoes when in engagement therewith to bind more tightly, both the clutch members being conical, and a spring tending to move one longitudinally with reference to the other.

29. The combination of a conical clutch member and a rotatable member mounted in a manner providing relative longitudinal movement, and a series of conically faced segmental friction shoes mounted on said rotatable member and adapted to have a transverse movement toward and from the other conical member.

30. The combination of a conical friction member and a series of complementarily faced conical friction shoes arranged in a circuit to provide an interrupted cone, and means for moving said cone as a whole bodily longitudinally of the axis of the clutch and for moving said segments individually transversely of such axis.

31. In a friction clutch, the combination of a conical clutch member, a coöperating member comprising individual clutch shoes having conical segmental faces and arranged in the form of an interrupted cone, means for causing relative axial movement between said clutch member and the interrupted cone, and means for causing transverse movement of the individual shoes.

32. In a friction clutch, the combination of a conical clutch member, a coöperating clutch member having a series of individual shoes which have segmental conical faces and are pivoted on a movable member to present an interrupted conical surface, means for causing said clutch member and said movable member to move toward and from each other, and means for causing the clutch shoes to swing outwardly and inwardly on their pivots on the movable member.

33. The combination with a conical clutch member, of a coöperating member which is an interrupted cone having individual shoes, and means for moving the interrupted cone bodily and for moving its shoes individually and successively.

34. The combination with a conical clutch member, of a coöperating member which is an interrupted cone having a series of segmental clutch shoes, means for moving the interrupted cone bodily, and a longitudinal sleeve having diverging grooves for moving the shoes individually.

35. In a friction clutch, the combination of a conical clutch member, a sleeve having diverging grooves, a spring between the sleeve and conical member tending to separate them axially, a member mounted on the sleeve, and a series of individual clutch shoes pivoted on said member and having their inner ends occupying said diverging grooves, said shoes having their outer ends in the form of segments of a cone.

36. In a friction clutch, the combination of a conical clutch member, a sleeve having diverging grooves, a spring between the sleeve and conical member tending to separate them axially, a member mounted on the sleeve, a series of individual clutch shoes pivoted on said member and having their inner ends occupying said diverging grooves, said shoes having their outer ends in the form of segments of a cone, said grooves diverging differently to enable progressive application of the shoes, and a spring between said sleeve and the member surrounding it tending to move the member into position where the clutch shoes engage.

In testimony whereof, I hereunto affix my signature in the presence of two witnesses.

VAN ZANDT M. MOORE.

Witnesses:
 ALBERT H. BATES,
 A. J. HUDSON.